June 2, 1970  K. R. TUCKER  3,515,397
ECCENTRIC CHUCK
Filed May 22, 1968
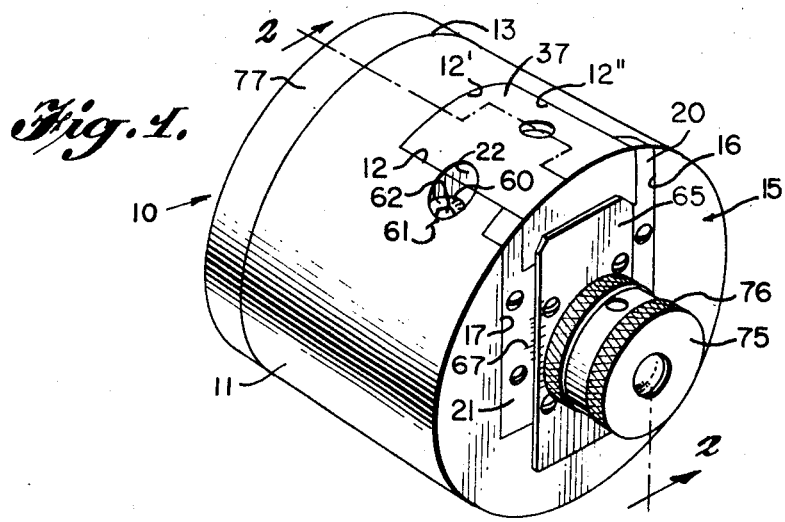
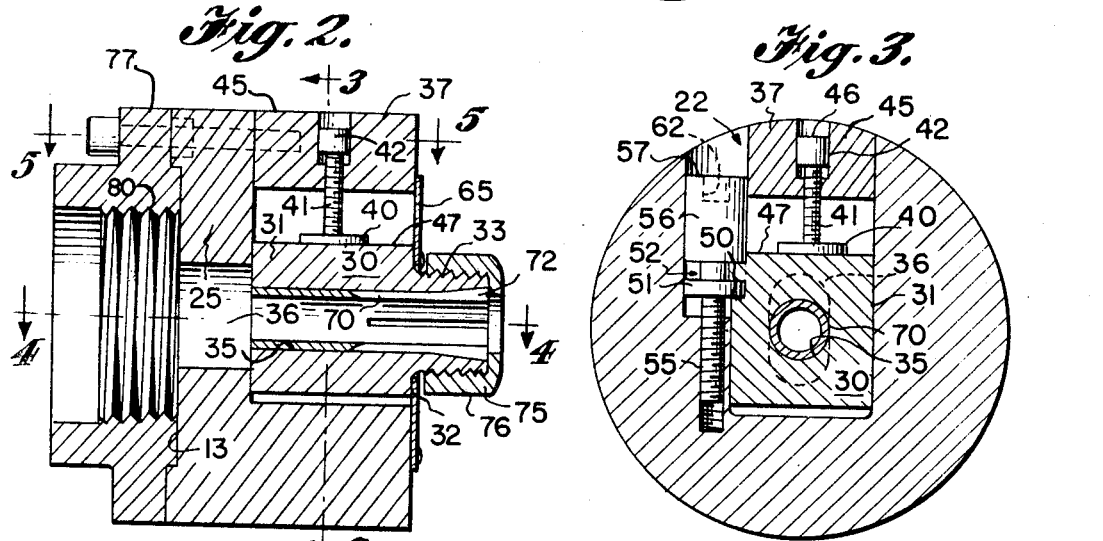
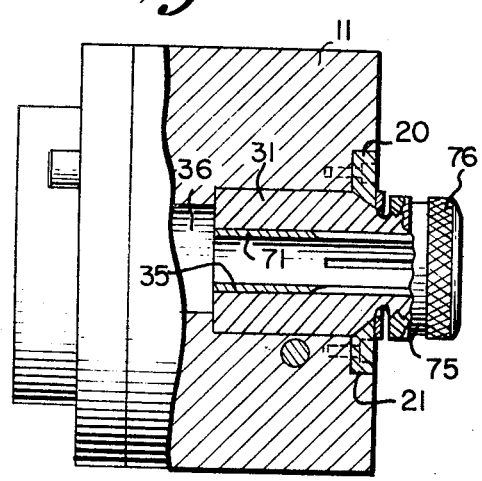
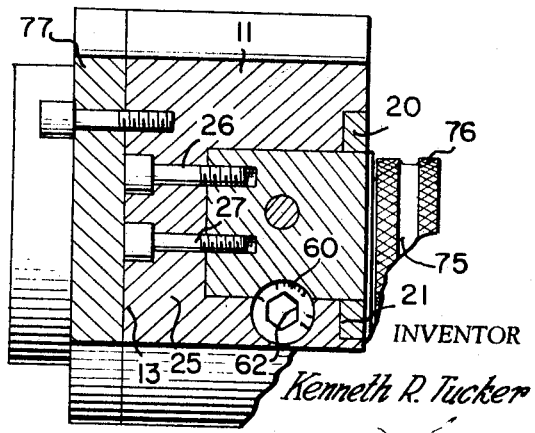
INVENTOR
Kenneth R. Tucker
BY
ATTORNEY United States Patent Office 3,515,397
Patented June 2, 1970

3,515,397
ECCENTRIC CHUCK
Kenneth Richard Tucker, Silver Spring, Md., assignor to the United States of America as represented by the Secretary of the Army
Filed May 22, 1968, Ser. No. 731,079
Int. Cl. B23b 5/22, 31/36
U.S. Cl. 279—6                              2 Claims

ABSTRACT OF THE DISCLOSURE

An eccentric chuck having a slotted chuck body with a movable block for holding workpieces of any length, the block disposed in the slot and operable to move in the slot but designed to remain confined within and in contact with the slot at all times. An adjustable locking block firmly bears upon the movable block to prevent it from moving and a micrometer adjusting screw operates upon the movable block to impart movement to the block in order to change the eccentricity setting of the chuck.

---

This invention relates to eccentric chucks and more particularly to a highly improved eccentric chuck.

Eccentric chucks are well known in the art. However, the prior art devices have several disadvantages which the present invention overcomes. Prior art devices have a great limitation as to the amount of eccentricity within the capability of the specific chuck. Another great disadvantage with prior art devices is that when the workpiece is removed, the setting for the desired degree of eccentricity is changed, and therefore when a new workpiece is inserted, the setting must again be adjusted. Therefore, the prior art devices require unreasonable amounts of time in adjusting the setting for the desired value of eccentricity. Another disadvantage of the prior art is that the means for adjusting the eccentricity are not extremely accurate and therefore tend to destroy the accuracy desired in the work performed. Also, the prior art devices are limited as to the length of the workpiece which the chuck can accept due to the physical configuration of the chuck body.

An object of the present invention is to provide a new and improved eccentric chuck.

Another object of the present invention is to provide a new and improved eccentric chuck which overcomes the disadvantages of the prior art.

Yet another object of the present invention is to provide an eccentric chuck, the use of which is extremely time-saving.

Another object of the present invention is to provide an eccentric chuck whose adjustment means are extremely fine and accurate.

Still a further object of the present invention is to provide an eccentric chuck whose eccentricity is not changed when the workpiece is removed from the chuck.

Another object of the present invention is to provide an eccentric chuck which is designed to accept any standard collet without damage to the threads of the collet.

A still further object of the present invention is to provide an eccentric chuck which holds the workpiece very tightly and which does not allow the desired eccentric setting to change while the chuck is in operation.

Another object of the p resent invention is to provide an eccentric chuck which is adapted to accept any length workpiece.

An eccentric chuck embodying the invention may include a body portion having a slot therein, workpiece holding means disposed in the slot and operable to translate in the slot but designed to remain confined within, and in contact with, the slot at all times, and an adjustable means for both firmly securing the workpiece holding means and for causing the workpiece holding means to translate in the slot in order to change the eccentricity setting of the chuck.

More specifically, in one embodiment of the present invention, an eccentric chuck is provided having a cylindrical shaped chuck body; a vertically disposed slot in the chuck body; a back plate secured to the chuck body for attaching the chuck to a machine; a movable block disposed in the slot, the movable block including a body and a front face having an extension for holding a workpiece, the body operable to translate in the slot but designed to remain confined within and in contact with the slot at all times; an adjustable locking block including a locking plate for firmly bearing upon the movable block to prevent the movable block from moving and a micrometer adjusting screw operable upon the movable block for imparting movement to the movable block in order to change the eccentricity setting of the chuck.

Other objects and advantages of the present invention will be apparent from the following description when considered in conjunction with the accompanying drawings, wherein:

FIG. 1 is an isometric view of an assembled chuck constructed in accordance with the present invention;

FIG. 2 is a vertical section taken along the line 2—2 of FIG. 1;

FIG. 3 is a vertical section taken along the line 3—3 of FIG. 2;

FIG. 4 is a partial, horizontal section taken along the line 4—4 of FIG. 2; and

FIG. 5 is a partial, horizontal section taken along the line 5—5 of FIG. 2.

In FIG. 1 there is shown a preferred embodiment of the present invention. An eccentric chuck 10 is provided comprising a chuck body 11. The chuck body 11 is a cylindrically shaped member having a vertically disposed slot therein defined by the numerals 12, 12' and 12" and a back face 13. In a front face 15 of the eccentric chuck body 11 are two grooved portions as defined by the numerals 16 and 17 for receiving and securing thereto block retaining bars 20 and 21, respectively. Viewing the eccentric chuck body 11 from the front, to the left of the slot defined by the numerals 12, 12' and 12" is a keyway 22, as shown in FIGS. 1 and 3. In the rear wall 25 of the same slot are two threaded holes 26 and 27.

A movable block 30 is provided which is disposed within and in contact with the slot as defined by 12, 12' and 12" of the eccentric chuck body 11. The movable block 30 has a body 31 being substantially cubical, a front face 32 upon which is a threaded, cylindrical front extension 33. The movable block 30 is provided with a hole 35 which passes longitudinally through both the front extension 33 and the body 31 of the movable block 30. Also provided through the rear wall 25 of the slot, as represented by 12, 12' and 12" of the eccentric chuck body 11, is a longitudinally positioned slot 36 which has a length equal to or greater than the travel of movable block 30, and a width equal to the diameter of the hole 35 which passes through the movable block 30. Disposed directly above the movable block 30 is a locking block 37, which is provided with a locking plate 40, which is adjusted by means of a locking screw 41 having a head 42, which is disposed in a top surface 45 of the locking block 37. The head 42 of the locking screw 41 is adapted to receive a hexagonal shaped tool for adjustment of the locking plate 40 which is designed to bear upon the top surface 47 of the movable block 30.

Referring now to FIG. 3, a recess 50 is provided in the left side of the movable block 30. This recess is designed to receive a flange 51 of a micrometer adjusting screw 52. The micrometer adjusting screw 52 is adapted to communicate with the keyway 22 of the eccentric chuck body 11. The micrometer adjusting screw 52 has a threaded portion 55 which is disposed below the flange 51 and a head 56 which is disposed directly above the flange 51. The head 56 of the micrometer screw 52 has a top surface 57 upon which is inscribed a numerical scale 60 such that one revolution of the micrometer adjusting screw 52 will change the eccentricity of the chuck by .025 inch. Inscribed on the chuck body 11 is a groove or line 61 opposite the numerical scale 60 on the top surface 57 of the head 56 of micrometer screw 52 so that the setting on the numerical scale 60 of the micrometer screw 52 may be easily determined. Recessed in the top surface 57 of the micrometer adjusting screw 52 is a hexagonal-shaped slot 62 designed to accept a hexagonal adjusting tool so that the setting on the scale 60 of the micrometer adjusting screw 52 may be easily set. Covering the front portions of the movable block 30 and the locking block 37 is a dust cover 65 which is adapted to be mounted upon the front face 32 of the movable block 30. The threaded, cylindrical extension 33 of the movable block 30 is designed to fit through a hole in the dust cover 65. The dust cover 65 is further provided with a venier scale 66 inscribed upon one vertical edge thereof. When the dust cover 65 is secured to the front face 32 of the movable block 30, adjacent the vernier scale 66 on the dust cover 65 is a second and matching venier scale 67 inscribed upon the block retainer bar 21 adjacent the vernier scale 66. The vernier scales 66 and 67 are provided to further break down the eccentricity adjustment into increments of ten thousandths.

Designed to be placed within the hole 35 of the movable block 30 is a standard collet such as that designated in FIGS. 2 and 3 by the numeral 70. Standard collets typically have threads on their shank portion. The collet threads are unnecessary in the present invention; because the hole 35 in the movable block 30 is of such diameter that the threads of the collet 70 are not in pressurized contact with any other surface, thus allowing any standard collet to be used without any adverse effect to the threads thereof. The collet 70 has a head 72 over which a collet cap 75 is partially positioned. The collet cap 75 is internally threaded and designed to engage with the threads of the threaded cylindrical extension 33 of the movable block 30; thus, the collet cap 75 is designed to hold the collet 70 firmly in its operable position when the collet cap 75 is tightly secured. When the collet cap 75 is loosened, the collet 70 may be removed from the hole 35 in the movable block 30. This feature allows collets to be interchanged without changing the eccentricity setting of the chuck. The outer surface 76 of the collet cap 75 is knurled in order that the collet cap 75 might be rotated by hand easier. Secured to the back face 13 of the eccentric chuck body 11 is a back plate 77 having a threaded portion 80 therein for securing it to the machine on which the chuck 10 is being used. The back plate 77 thus allows the chuck 10 to be moved from one machine to another without the need of disturbing the eccentricity setting.

In the assembly and operation of the eccentric chuck 10, first any standard collet such as the collet 70 is inserted in the hole 35 in the movable block 30. The collet cap 75 is then placed over the collet head 12 and secured to the threaded, cylindrical extension 33 of the movable block 30. The workpiece is then inserted in the head 72 of the collet 70 and the collet cap 75 is tightly secured to the threaded cylindrical extension 33 of the movable block 30. If the locking screw 41 is tightly secured, it must first be loosened in order to change the eccentricity setting of the chuck 10. After unloosening the locking screw 41, the micrometer adjusting screw 52 may be rotated, and the desired eccentricity may be set by turning the micrometer adjusting screw 52 and setting the proper numbers on both the scale 60 on the top surface 57 of the micrometer adjusting screw 52 and by aligning the proper setting on the vernier scales 66 and 67 on the dust cover 65 and on the adjacent block retainer bar 21, respectively. Once the desired setting is obtained the locking plate 40 is tightened firmly against the top surface 47 of the movable block 30. When the locking screw 41 is tight, the micrometer adjusting screw 52 is immovable, and therefore, the setting on the micrometer adjusting screw 52 cannot be changed, and the eccentricity setting of the chuck will not be disturbed at all. Therefore, the locking block 37 is extremely important in that it not only firmly bears on the top surface 47 of the movable block 30 and when secured, does not allow any movement or change in the eccentricity setting of the chuck when in operation, but it also serves the very useful function of taking a great deal of the pressure and stress off of the threaded portion 55 of the micrometer adjusting screw 52. If it were not for the locking block 37, the threaded portion 55 of the micrometer adjusting screw 52 would receive all of the pressure and stress of the movable block 30 and, therefore, would be very susceptible to being sheared off and would require frequent replacement. With the provision of its own back plate 77, the chuck 10 may be moved very easily from one machine to another; for example, the chuck 10 could be moved from a lathe to a milling machine or viceversa, and any such move from one machine to another could be made without disturbing the eccentricity setting of the chuck. Also, the movable block 30 at all times remains entirely within the confines of the slot as defined by 12, 12' and 12" of the chuck body 11. This is a great advantage in that the possibility of the eccentricity setting being thrown off during operation is eliminated. Also, any length workpiece could be employed with the chuck 10 since the slot as defined by 12, 12' and 12" in the rear wall 25 of the slot of the chuck body 11 allows any workpiece to pass therethrough. It can be seen, then, that the present invention provides an eccentric chuck which has an extremely fine and accurate method of setting the eccentricity and maintaining that setting during operation and an eccentric chuck which is extremely time-saving in its operation.

While only a preferred embodiment of the present invention has been shown, the chuck 10 may be altered or modified in various ways. For example, if a very fine adjustment is not necessary, the vernier scales 66 and 67 inscribed on the dust cover 65 and the block retainer bar 21, respectively, could be eliminated. Also, while a standard collet such as 70 has been shown, any special collet without a threaded portion may be employed with the chuck 10. Various other modifications are contemplated and may obviously be resorted to by those skilled in the art without departing from the spirit and scope of the invention, as hereinafter defined by the appended claims, as only a preferred embodiment thereof has been disclosed.

What is claimed is:

1. An eccentric chuck comprising:
a chuck body having a slot therein normal to the axis of rotation of the chuck body;
a back plate secured to the chuck body for attaching the chuck to a machine;
a movable body disposed in the slot for holding a workpiece, said movable body having a recess in its side and operable to translate in the slot but designed to remain confined within and in contact with the slot at all times;
an adjustable locking means including an adjustable locking block, a locking plate, and a locking plate screw attached to the locking plate and having a head recessed in the top surface of the locking block, the locking plate being adjustable by means of the locking plate screw to firmly bear upon the movable block in order to prevent the movable block from moving;

and a micrometer adjusting screw, including a head, a flange disposed below the head for engagement with the recess in the side of the movable block, and a threaded portion disposed below the flange and operable in a keyway in the chuck body, disposed normal to the axis of rotation of said body, for imparting movement to the movable block in order to change the eccentricity setting of the chuck.

2. An eccentric chuck in accordance with claim 1 further including:

a groove adjacent the slot in the front face of the chuck body;

two members affixed in the groove, and disposed normal to the axis of rotation of the body, a first member having a vernier scale imposed thereon; and a cover having a hole therein for receiving the front extension of the movable block, the cover being secured to the movable block and having a vernier scale imposed on a normal edge thereof which is adjacent to and in working relation with the vernier scale on the first member.

References Cited

UNITED STATES PATENTS

| | | | |
|---|---|---|---|
| 2,463,857 | 3/1949 | Dietz | 279—6 |
| 2,654,610 | 10/1953 | De Vlieg | 279—6 |
| 3,044,323 | 7/1962 | Sweeny | 279—6 |

ROBERT C. RIORDON, Primary Examiner

D. D. EVENSON, Assistant Examiner